(12) United States Patent
Hashimoto et al.

(10) Patent No.: US 12,447,988 B2
(45) Date of Patent: Oct. 21, 2025

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventors: Osami Hashimoto, Mishima (JP); Hiroki Tashima, Fujisawa (JP); Toshihiko Inoue, Nagoya (JP); Kazuma Toya, Anjo (JP); Takashi Tazoe, Nagoya (JP); Ryota Bingo, Nisshin (JP); Kosuke Sakakibara, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 168 days.

(21) Appl. No.: 18/471,522

(22) Filed: Sep. 21, 2023

(65) Prior Publication Data

US 2024/0182059 A1    Jun. 6, 2024

(30) Foreign Application Priority Data

Dec. 2, 2022 (JP) .................................. 2022-193801

(51) Int. Cl.
| | |
|---|---|
| *B60W 50/14* | (2020.01) |
| *B60W 40/02* | (2006.01) |
| *G01C 21/34* | (2006.01) |
| *G01C 21/36* | (2006.01) |
| *G06V 20/13* | (2022.01) |

(52) U.S. Cl.
CPC ............ *B60W 50/14* (2013.01); *B60W 40/02* (2013.01); *G01C 21/3415* (2013.01); *G01C 21/3461* (2013.01); *G01C 21/3691* (2013.01); *G06V 20/13* (2022.01); *B60W 2050/143* (2013.01); *B60W 2050/146* (2013.01); *B60W 2530/20* (2013.01); *B60W 2555/20* (2020.02)

(58) Field of Classification Search
CPC ................. B60W 50/14; B60W 40/02; B60W 2050/143; B60W 2050/146; B60W 2530/20; B60W 2555/20; G01C 21/3415; G01C 21/3461; G01C 21/3691; G06V 20/13; G01M 17/02; B60K 35/00; B60Q 9/00; B60R 16/023; G08G 1/0137; G08G 1/048
See application file for complete search history.

(56) References Cited

U.S. PATENT DOCUMENTS

| | | | |
|---|---|---|---|
| 2014/0303885 A1 | 10/2014 | Kamada et al. | |
| 2017/0089721 A1* | 3/2017 | Akselrod | G01C 21/3407 |
| 2017/0278314 A1* | 9/2017 | Laskey | B60C 11/246 |
| 2021/0291597 A1 | 9/2021 | Suzuki et al. | |
| 2021/0345567 A1* | 11/2021 | Klemm | G01J 5/0859 |

FOREIGN PATENT DOCUMENTS

| | | |
|---|---|---|
| JP | 2008-162332 A | 7/2008 |
| JP | 2014-202690 A | 10/2014 |
| WO | 2020/122189 A1 | 6/2020 |

\* cited by examiner

*Primary Examiner* — Brian A Zimmerman
*Assistant Examiner* — Cal J Eustaquio
(74) *Attorney, Agent, or Firm* — SoraIP, Inc.

(57) ABSTRACT

An information processing device acquires a travel route to a destination, acquires a satellite image captured by an artificial satellite, the satellite image being an image of a place corresponding to the travel route, estimates an amount of solar radiation on the travel route based on the satellite image, and notifies the user when the amount of solar radiation is equal to or greater than a threshold.

13 Claims, 5 Drawing Sheets

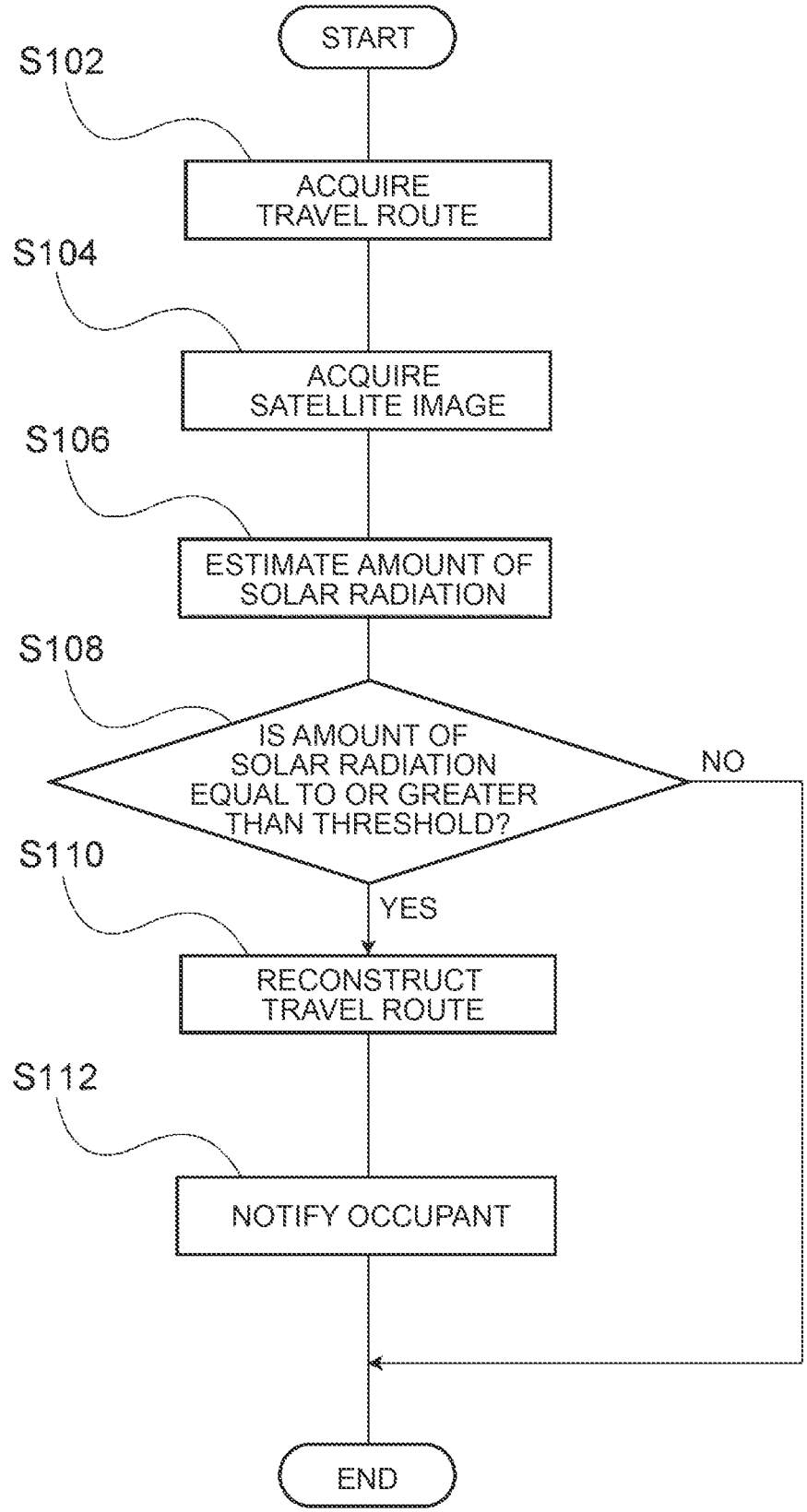

INFORMATION PROCESSING DEVICE AND INFORMATION PROCESSING METHOD

CROSS-REFERENCE TO RELATED APPLICATION

This application claims priority to Japanese Patent Application No. 2022-193801 filed on Dec. 2, 2022, incorporated herein by reference in its entirety.

BACKGROUND

1. Technical Field

The present disclosure relates to information processing devices and information processing methods.

2. Description of Related Art

Japanese Unexamined Patent Application Publication No. 2008-162332 (JP 2008-162332 A) discloses an image display device for a vehicle that calculates a direction of solar radiation based on data received from Global Positioning System (GPS) satellites and a direction of travel of the vehicle, and adjusts the brightness of a display panel based on the direction of solar radiation.

SUMMARY

However, the device described in JP 2008-162332 A can only calculate the direction of solar radiation and cannot identify deterioration of the vehicle etc. due to the amount of solar radiation.

It is an object of the present disclosure to provide an information processing device and an information processing method that can identify deterioration of a vehicle etc. due to the amount of solar radiation.

An information processing device of a first aspect is configured to acquire a travel route to a destination, acquire a satellite image captured by an artificial satellite, the satellite image being an image of a place corresponding to the travel route, estimate an amount of solar radiation on the travel route based on the satellite image, and send a notification when the amount of solar radiation is equal to or greater than a threshold.

The information processing device of the first aspect acquires the satellite image of the place corresponding to the travel route to the destination. This information processing device also estimates the amount of solar radiation on the travel route based on the satellite image. It is therefore possible to estimate a real-time amount of solar radiation in consideration of the weather etc.

This information processing device sends a notification when the amount of solar radiation is equal to or greater than the threshold. A user can thus grasp deterioration of a vehicle due to the amount of solar radiation. The estimation of the amount of solar radiation may be performed using, for example, machine learning. That is, the amount of solar radiation may be estimated using a learned model that outputs the amount of solar radiation on a travel route when the travel route, a satellite image, etc. are input to the learned model. In this case, the learned model may perform model learning using, as training data, a plurality of training data sets composed of sets of the following two types of data: data including a travel route and a satellite image corresponding to the travel route, and data on the amount of solar radiation. As an example, the learned model is machine-learned by a known method such as deep learning.

According to an information processing device of a second aspect, in the first aspect, the information processing device may further be configured to, when the amount of solar radiation on the travel route is equal to or greater than the threshold, reconstruct the travel route in such a way that the amount of solar radiation becomes smaller than the threshold.

The information processing device of the second aspect reconstructs the travel route so that the amount of solar radiation becomes smaller than the threshold. This can reduce deterioration of the vehicle.

According to an information processing device of a third aspect, in the second aspect, the information processing device may further be configured to reconstruct the travel route by adding information on a direction of solar radiation during traveling of a vehicle.

The information processing device of the third aspect reconstructs the travel route by adding the information on the direction of solar radiation. Therefore, it is possible to set a travel route in which the driver is not dazzled by the sun by, for example, excluding any travel route in which a direction of travel of the vehicle coincides with the direction of the sun.

According to an information processing device of a fourth aspect, in the first aspect, the information processing device may further be configured to calculate a degree of deterioration of a tire of a vehicle based on the estimated amount of solar radiation, and notify the calculated degree of deterioration of the tire.

The information processing device of the fourth aspect notifies the degree of deterioration of the tire. The user can thus directly grasp the degree of deterioration of the tire.

An information processing method of a fifth aspect includes: acquiring a travel route to a destination; acquiring a satellite image captured by an artificial satellite, the satellite image being an image of a place corresponding to the travel route; estimating an amount of solar radiation on the travel route based on the satellite image; and sending a notification when the amount of solar radiation is equal to or greater than a threshold.

As described above, according to the information processing device and the information processing method of the present disclosure, it is possible to identify deterioration of a vehicle etc. due to the amount of solar radiation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flowchart illustrating an example of a flow of information processing according to the embodiment.

DETAILED DESCRIPTION OF EMBODIMENTS

An information processing system S including the information processing device 10 according to the embodiment will be described with reference to the drawings.

Figure 1:
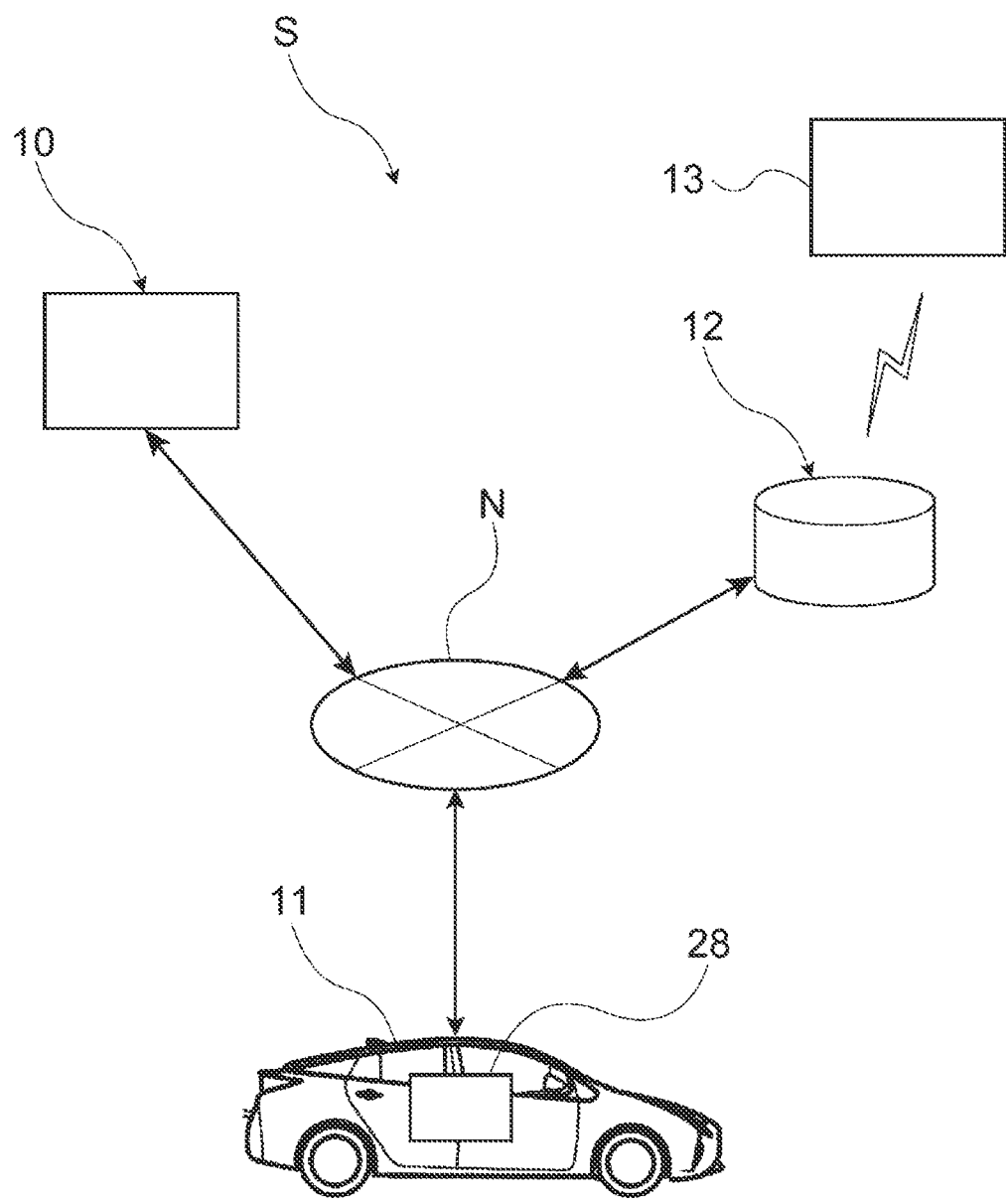
FIG. 1 is a schematic diagram schematically illustrating an entire system according to an embodiment.

As illustrated in FIG. 1, the information processing system S according to the present embodiment includes an information processing device 10, a server 12, and a vehicle 11. The information processing device 10, the server 12, and the vehicle 11 are connected to each other via a network N and can communicate with each other.

The information processing device 10 is installed outside the vehicle 11, for example, and is configured to transmit the requested information in response to an instruction from the vehicle 11. Further, the information processing device 10 is configured to be able to acquire various kinds of information from the server 12 via the network N. The information processing device 10 may be connected to the plurality of vehicles 11 via a network N.

The vehicle 11 includes an in-vehicle device 28. The in-vehicle device 28 of the present embodiment is, for example, an Electronic Control Unit (ECU) that performs various controls. The server 12 is installed outside the vehicle 11 and is configured to be capable of receiving data from an artificial satellite 13. Therefore, the server 12 stores satellite images captured by the artificial satellite. Further, the server 12 stores map information and the like, and transmits necessary map information via the network N in response to a request from the in-vehicle device 28 (vehicle 11).

The information processing system S of the present embodiment is configured as described above, and the information processing device 10 acquires a travel route to a destination of the vehicle 11, acquires a satellite image captured by the artificial satellite 13, the satellite image being an image of a place corresponding to the travel route, and estimates the amount of solar radiation on the travel route based on the satellite image. The information processing device 10 is configured to notify the user when the amount of solar radiation is equal to or greater than a threshold.

Hardware Configuration of Information Processing Device 10

Figure 2:
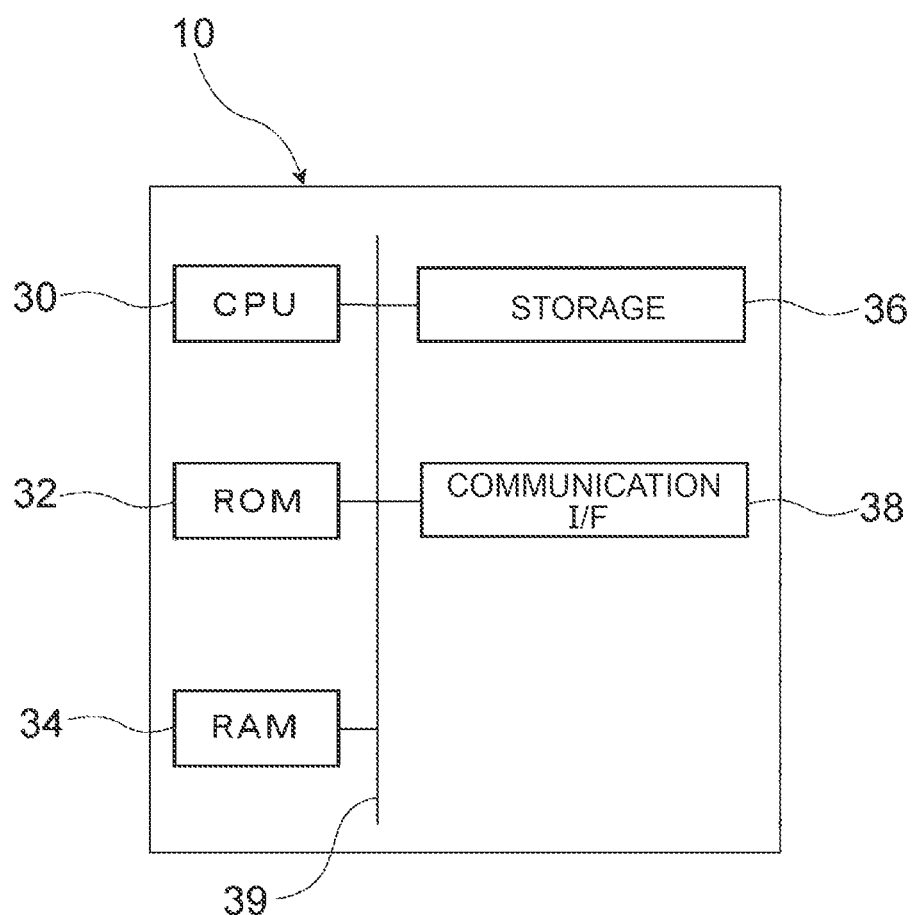
FIG. 2 is a block diagram illustrating a hardware configuration of the information processing device according to the embodiment.

As illustrated in FIG. 2, the information processing device 10 includes a Central Processing Unit (CPU: processor) 30, a Read Only Memory (ROM) 32, Random Access Memory (RAM) 34, a storage 36, and a communication interface (including a communication I/F) 38. The components are communicably connected to each other via an internal bus 39.

The CPU 30 is a central processing unit that executes various programs and controls each unit. That is, the CPU 30 reads the program from the ROM 32 or the storage 36, and executes the program using the RAM 34 as a working area. In addition, the CPU 30 performs control of the above-described configurations and various arithmetic processes in accordance with programs recorded in the ROM 32 or the storage 36.

The ROM 32 stores various programs and various data. The RAM 34 temporarily stores a program/data as a working area. The storage 36 is a non-transitory recording medium configured by Hard Disk Drive (HDD) or Solid State Drive (SSD) and storing various programs including an operating system and various types of data. In the present embodiment, the ROM 32 or the storage 36 stores programs and the like for performing various processes.

The communication I/F 38 is a face for the information processing device 10 to communicate with the server 12, the in-vehicle device 28, and other devices, and standards such as Controller Area Network (CAN), Ethernet (registered trademark), Long Term Evolution (LTE), Fiber Distributed Data Interface (FDDI), and Wi-Fi (registered trademark) are used.

Hardware Configuration of In-Vehicle Device 28

Figure 3:
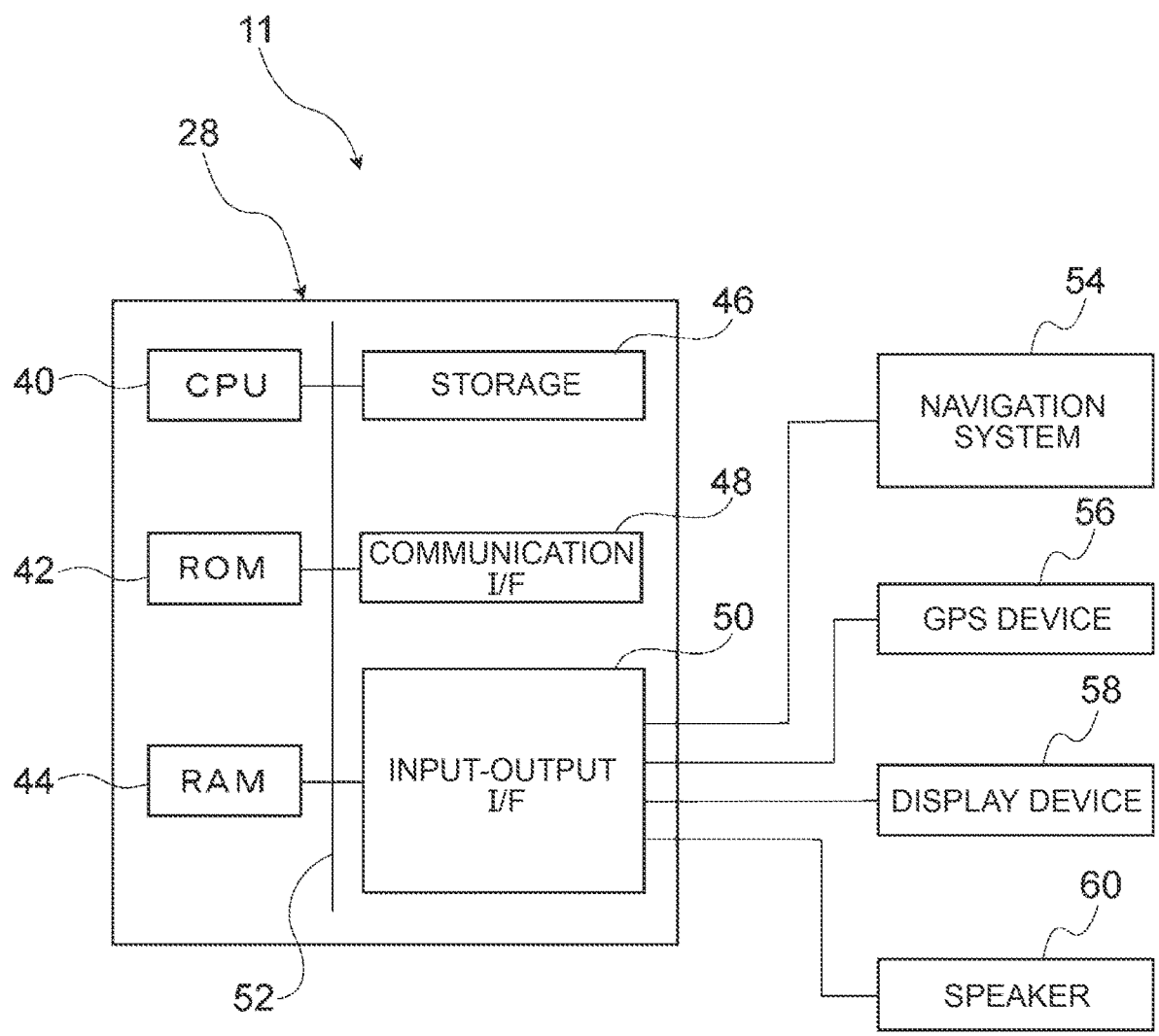
FIG. 3 is a block diagram illustrating a hardware configuration of an in-vehicle device according to the embodiment.

As illustrated in FIG. 3, the in-vehicle device 28 includes a CPU 40, a ROM 42, a RAM 44, a storage 46, and a communication interface (a communication I/F) 48 and an input/output interface (including an input/output I/F) 50. Each configuration is communicably connected to each other via an internal bus 52.

The CPU 40 is a central processing unit that executes various programs and controls each unit. That is, the CPU 40 reads the program from the ROM 42 or the storage 46, and executes the program using the RAM 44 as a working area. In addition, the CPU 40 performs control of the above-described configurations and various arithmetic processes in accordance with programs recorded in the ROM 42 or the storage 46.

The ROM 42 stores various programs and various data. The RAM 44 temporarily stores a program/data as a working area. The storage 46 is a non-transitory recording medium configured by a HDD or a SSD and storing various programs including an operating system and various data.

The communication I/F 48 is a face for the in-vehicle device 28 to communicate with servers and other devices, and standards such as Controller Area Network (CAN), Ethernet (registered trademark), Long Term Evolution (LTE), Fiber Distributed Data Interface (FDDI), and Wi-Fi (registered trademark) are used.

A navigation system 54, a Global Positioning System (GPS) device 56, a display device 58, and a speaker 60 are connected to the input/output I/F 50. The navigation system 54 sets a travel route from the current location of the vehicle 11 to the destination, and performs various guidance so that the vehicle 11 can travel along the travel route. At this time, the navigation system 54 appropriately acquires the map information from the server 12. In addition, in a case where some or all of the map information is stored in the storage 46, the travel route may be set without acquiring the map information from the server 12.

The GPS device 56 is a device that receives GPS signals from GPS satellites to determine the current location of the vehicle 11. The display device 58 displays various kinds of information on a display unit (not shown) installed in a vehicle cabin. For example, the display device 58 displays information on the travel route set by the navigation system 54, information on the amount of solar radiation, and the like on the display unit.

The speaker 60 is installed in the vehicle cabin and is configured to be capable of outputting sound to an occupant.

Functional Configuration of Information Processing Device 10

The information processing device 10 implements various functions using the above hardware resources. A functional configuration implemented by the information processing device 10 will be described with reference to FIG. 4.

Figure 4:
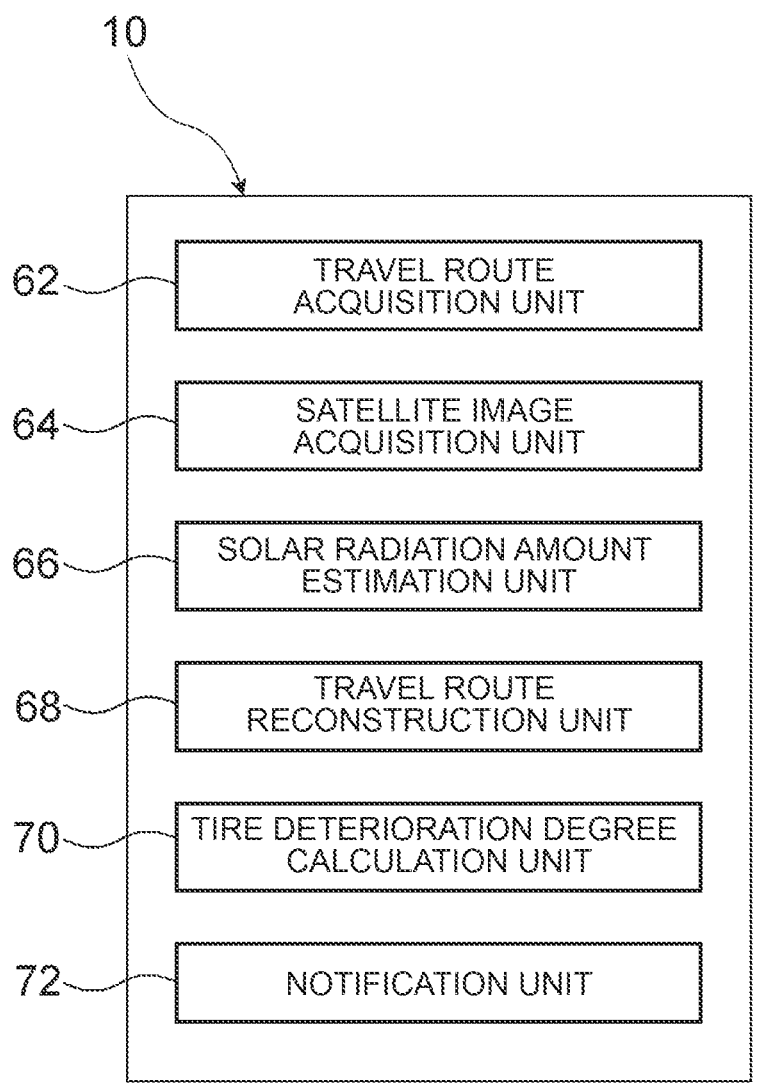
FIG. 4 is a block diagram illustrating a functional configuration of the information processing device according to the embodiment.

As illustrated in FIG. 4, the information processing device 10 includes, as functional components, a travel route acquisition unit 62, a satellite image acquisition unit 64, a solar radiation amount estimation unit 66, a travel route reconstruction unit 68, a tire deterioration degree calculation unit 70, and a notification unit 72. The respective functional configurations are realized by the CPU 30 reading and executing a program stored in the ROM 32 or the storage 36.

The travel route acquisition unit 62 acquires a travel route from the current location of the vehicle 11 to the destination. Specifically, the current location of the vehicle 11 is set based on the data from the GPS device 56, and the travel route from the current location of the vehicle 11 to the destination is calculated. The destination may be configured to be input to the information processing device 10 by an operation of the occupant etc.

The calculation of the travel route may be performed by the in-vehicle device 28, or may be performed by an external server 12 or the like. For example, by sending the current location information of the vehicle 11 and the information of the destination to the server 12, the travel route may be calculated by the server 12 with reference to the map information. The travel route acquisition unit 62 acquires information on the travel route calculated by the in-vehicle device 28 or the server 12.

The satellite image acquisition unit 64 acquires a satellite image captured by the artificial satellite 13. Specifically, the satellite image acquisition unit 64 accesses the server 12 and acquires a satellite image corresponding to the travel route from among the satellite images stored in the server 12. The satellite image acquired by the satellite image acquisition unit 64 is a satellite image in which a portion where sunlight is shining and a shadowed portion can be distinguished from each other.

The solar radiation amount estimation unit 66 estimates the amount of solar radiation on the travel route based on the satellite image acquired by the satellite image acquisition unit 64. In the present embodiment, the amount of solar radiation is estimated by using the learned model as an example. Specifically, the estimated value of the amount of solar radiation on the travel route is output by inputting information of the travel route and satellite images to the learned model. The information of the satellite images that are input may be satellite images captured at the same place at predetermined time intervals. In addition to the information on the travel route and the satellite image, weather information may be input. The learned model may perform model learning using, as teacher data, a plurality of learning data sets including a set of data including satellite images corresponding to the travel route and the travel route and data of the amount of solar radiation. For example, a solar radiation sensor mounted on a vehicle may be used for data on the amount of solar radiation. As an example, the learned model is machine-learned by a known method such as deep learning.

When the amount of solar radiation on the travel route is equal to or greater than the threshold, the travel route reconstruction unit 68 reconstructs the travel route so that the amount of solar radiation becomes smaller than the threshold. Specifically, when the amount of solar radiation on the travel route estimated by the solar radiation amount estimation unit 66 is equal to or greater than a preset threshold, the travel route reconstruction unit 68 specifies a travel route whose amount of solar radiation is smaller than the threshold from candidate travel routes different from the travel route acquired by the travel route acquisition unit 62. As another method, the travel route reconstruction unit 68 may specify a travel route capable of traveling in the shade by changing a part of the travel route acquired by the travel route acquisition unit 62. The amount of solar radiation that is used to determine whether the amount of solar radiation on the travel route is equal to or greater than the threshold may be the amount of solar radiation on the entire travel route, or the amount of solar radiation for each predetermined distance of the travel route.

In the present embodiment, as an example, the travel route reconstruction unit 68 reconstructs the travel route by adding information on the direction of solar radiation during traveling of the vehicle 11. Specifically, the travel route reconstruction unit 68 excludes a travel route in which the sun is located in the traveling direction of the vehicle 11 with respect to the candidate travel route. That is, the travel route is reconstructed such that a state in which light is sent from the front of the occupant during traveling of the vehicle 11 is minimized.

The tire deterioration degree calculation unit 70 calculates the degree of deterioration of a tire of the vehicle 11 based on the estimated amount of solar radiation. Specifically, the tire deterioration degree calculation unit 70 acquires the information of the tire of the vehicle 11 stored in advance in the storage 36, the external server, or the like, and estimates the current degree of deterioration of the tire. The degree of deterioration of the tire is estimated from the traveled distance of the vehicle 11, the use time, the elapsed time after replacement, the amount of solar radiation, and the like.

The tire deterioration degree calculation unit 70 calculates the degree of deterioration of the tire in a case where the vehicle travels on the travel route, in consideration of the amount of solar radiation estimated by the solar radiation amount estimation unit 66 with respect to the estimated current degree of deterioration of the tire. At this time, the tire deterioration degree calculation unit 70 may estimate the degree of deterioration of the tire using the learned model. Specifically, by inputting information on the current degree of deterioration of the tire, the travel route, and the amount of solar radiation to the learned model, an estimated value of the degree of deterioration of the tire in the case where the vehicle travels on the travel route is output from the learned model. The tire deterioration degree calculation unit 70 may estimate the degree of deterioration of the tire by further inputting information such as a road surface condition of the travel route.

The notification unit 72 performs notification when the amount of solar radiation estimated by the solar radiation amount estimation unit 66 is equal to or greater than the threshold. The notification by the notification unit 72 is performed by display by the display device 58, output of sound by the speaker 60, and the like.

When the travel route is reconstructed by the travel route reconstruction unit 68, the notification unit 72 causes the display device 58 to display the original travel route and the reconstructed travel route in the display area. At this time, the notification unit 72 may also display an estimated value of the amount of solar radiation when traveling on each travel route.

Furthermore, the notification unit 72 notifies the degree of deterioration of the tire calculated by the tire deterioration degree calculation unit 70. In the case where the degree of deterioration of the tire has reached a reference degree of deterioration for replacement, the notification unit 72 may send a notification prompting the replacement of the tire.

Effects

Next, the effect of the present embodiment will be described.

An example of information processing for notifying the occupant of information will be described with reference to a flowchart illustrated in FIG. 5. This display process is executed by the CPU 30 reading the display program from the ROM 32 or the storage 36, expanding the program in the RAM 34, and executing the program. In the present embodiment, as an example, the information processing is executed when the travel route is displayed after the destination is set by the user.

The CPU 30 acquires a travel route in S102. Specifically, the CPU 30 acquires the travel route acquisition from the current location of the vehicle 11 to the destination by the function of the travel route acquisition unit 62.

The CPU 30 acquires satellite-images at S104. Specifically, the CPU 30 acquires a satellite image corresponding to the travel route from among the satellite images stored in the server 12 by the function of the satellite image acquisition unit 64.

The CPU 30 estimates the amount of solar radiation in S106. Specifically, the CPU 30 estimates the amount of solar radiation on the travel route based on the satellite image acquired by the satellite image acquisition unit 64 by the function of the solar radiation amount estimation unit 66.

In S108, the CPU 30 determines whether the amount of solar radiation is equal to or greater than the threshold. Specifically, the CPU 30 compares the amount of solar radiation estimated in S106 with a predetermined threshold. When the amount of solar radiation is equal to or greater than the threshold, the process proceeds to S110. On the other hand, when the amount of solar radiation estimated in S106 is smaller than the threshold, the CPU 30 terminates this process.

The CPU 30 reconstructs the travel route in S110. Specifically, the CPU 30 reconstructs the travel route by the function of the travel route reconstruction unit 68 so that the amount of solar radiation becomes smaller than the threshold. For example, the travel route reconstruction unit 68 identifies a travel route whose amount of solar radiation is smaller than the threshold from the candidate travel routes different from the travel route acquired by the travel route acquisition unit 62. At this time, the CPU 30 may reconstruct the travel route by adding information on the direction of solar radiation during traveling of the vehicle 11.

The CPU 30 notifies the occupant by S112. Specifically, the CPU 30 notifies, by the function of the notification unit 72, the occupant that the amount of solar radiation estimated by the solar radiation amount estimation unit 66 is equal to or greater than the threshold. The notification by the notification unit 72 is performed by display by the display device 58, output of sound by the speaker 60, and the like.

The CPU 30 causes the display device 58 to display the original travel route and the reconstructed travel route in the display area by S112. At this time, an estimated value of the amount of solar radiation when traveling on each travel route may be displayed together. Furthermore, the notification unit 72 may notify the degree of deterioration of the tire calculated by the tire deterioration degree calculation unit 70. Then, the CPU 30 ends this process.

As described above, according to the information processing system S and the information processing device 10 of the present embodiment, the satellite image of the place corresponding to the travel route to the destination is acquired, and the amount of solar radiation on the travel route is estimated based on the satellite image. The real-time amount of solar radiation can be estimated in consideration of the weather etc.

The notification unit 72 notifies the user when the amount of solar radiation is equal to or greater than the threshold. The user can thus grasp deterioration of the vehicle 11 due to the amount of solar radiation.

Further, in the present embodiment, the travel route reconstruction unit 68 reconstructs the travel route so that the amount of solar radiation becomes smaller than the threshold. This can reduce deterioration of the vehicle 11. In particular, in the present embodiment, the travel route is reconstructed by adding information on the direction of solar radiation. Therefore, it is possible to set a travel route in which the driver is not dazzled by the sun by, for example, excluding any travel route in which the direction of travel of the vehicle 11 coincides with the direction of the sun.

Furthermore, in the present embodiment, the notification unit 72 notifies the degree of deterioration of the tire. The user can thus directly grasp the degree of deterioration of the tire.

Although the information processing system S and the information processing device 10 according to the embodiment have been described above, it is needless to say that the present disclosure can be implemented in various forms without departing from the gist of the present disclosure. For example, in the above embodiment, the travel route reconstruction unit 68 reconstructs the travel route when the amount of solar radiation on the travel route is equal to or greater than the threshold. However, the present disclosure is not limited to this. That is, when the amount of solar radiation on the travel route is equal to or greater than the threshold, the user may be notified of this, and the user may be inquired whether to reconstruct the travel route. In this case, when the user does not want to reconstruct the travel route, unnecessary processing is not performed.

Further, a process executed by the CPU 30 reading the program in the above-described embodiment may be executed by various processors other than the CPU 30. Examples of the processor include a Programmable Logic Device (PLD) in which a circuit configuration can be changed after manufacturing of Field-Programmable Gate Array (FPGA), and the like, and a dedicated electric circuit that is a processor having a circuit configuration designed exclusively for executing a particular process such as Application-Specific Integrated Circuit (ASIC), and the like. In addition, the above processes may be executed by one of these various processors, or may be executed by a combination of two or more processors of the same kind or different kinds. For example, the processes may be executed by a plurality of FPGAs, a combination of the CPU and the FPGA, and the like. Furthermore, the hardware structure of each of the various processors is, more specifically, an electric circuit in which circuit elements such as semiconductor elements are combined.

Further, in the above embodiment, the storage 36 is configured to store various data. However, the present disclosure is not limited to this. For example, a non-transitory recording medium such as Compact Disk (CD), Digital Versatile Disk (DVD), and Universal Serial Bus (USB) memories may be used as the storage unit. In this case, various programs, data, and the like are stored in these recording media.

Furthermore, the flow of the processing described in the above embodiment is an example, and unnecessary steps may be deleted, new steps may be added, or the processing order may be changed without departing from the gist.

What is claimed is:

1. An information processing device comprising:
   a processor configured to acquire a travel route of a vehicle to a destination set by a user based on data captured by a Global Positioning System device, the travel route being composed of a plurality of segments, acquire a satellite image from a server, the satellite image being captured by an artificial satellite and being an image of a place corresponding to the travel route, calculate an amount of solar radiation on the travel route based on the satellite image, determine whether the amount of solar radiation is equal to or greater than a threshold, and notify the user that the amount of solar radiation is equal to or greater than the threshold in a case where the determined amount of solar radiation is equal to or greater than the threshold, wherein the processor reconstructs the travel route by excluding candidate segments in which the sun is located in a direction that the vehicle travels, until the amount of solar radiation on the reconstructed travel route is smaller than the threshold in the case where the determined amount of solar radiation on the travel route is equal to or greater than the threshold, wherein the amount of solar radiation over an entirety of the travel route is used in the determining of whether the amount of solar radiation on the travel route is equal to or greater than the threshold.

2. The information processing device according to claim 1, wherein the processor is further configured to;

reconstruct the travel route by adding information on a direction of solar radiation during traveling of the vehicle.

3. The information processing device according to claim 1, wherein the processor is further configured to;

calculate a degree of tire deterioration for a tire of the vehicle based on the calculated amount of solar radiation; and notify the user of the calculated degree of tire deterioration.

4. An information processing method, comprising:

acquiring a travel route of a vehicle to a destination set by a user based on data captured by a Global Positioning System device;

acquiring a satellite image from a server, the satellite image being captured by an artificial satellite and being an image of a place corresponding to the travel route, the travel route being composed of a plurality of segments;

calculating an amount of solar radiation on the travel route based on the satellite image;

determining whether the amount of solar radiation is equal to or greater than a threshold; and notifying the user that the amount of solar radiation is equal to or greater than the threshold in a case where the determined amount of solar radiation is equal to or greater than the threshold, wherein the travel route is reconstructed by excluding candidate segments in which the sun is located in a direction that the vehicle travels from the plurality of segments of the travel route, until the amount of solar radiation on the reconstructed travel route is smaller than the threshold in the case where the determined amount of solar radiation on the travel route is equal to or greater than the threshold, and the amount of solar radiation over an entirety of the travel route is used in the determining of whether the amount of solar radiation on the travel route is equal to or greater than the threshold.

5. The information processing method according to claim 4, further comprising:

reconstructing the travel route by adding information on a direction of solar radiation during traveling of the vehicle.

6. The information processing method according to claim 4, further comprising:

calculating a degree of tire deterioration for a tire of the vehicle based on the calculated amount of solar radiation; and notifying the user of the calculated degree of tire deterioration.

7. The information processing device according to claim 1, wherein the processor is further configured to:

determine whether the amount of solar radiation on the travel route is equal to or greater than the threshold based on the amount of solar radiation over an entirety of the travel route.

8. The information processing device according to claim 3, wherein the processor is further configured to:

calculate the degree of tire deterioration for the tire based on a distance that the vehicle has traveled, a time that the tire has been used, an elapsed time from a time that the tire is replaced with a previous tire, the amount of solar radiation, and a road surface condition of the travel route.

9. The information processing device according to claim 3, wherein the processor is further configured to:

calculate the degree of tire deterioration for the tire by using a learning model.

10. The information processing method according to claim 6, further comprising:

calculating the degree of tire deterioration for the tire based on a distance that the vehicle has traveled, a time that the tire has been used, an elapsed time from a time that the tire is replaced with a previous tire, the amount of solar radiation, and a road surface condition of the travel route.

11. The information processing method according to claim 6, further comprising:

calculating the degree of tire deterioration for the tire by using a learning model.

12. The information processing device according to claim 1, wherein the processor is further configured to:

acquire multiple candidate travel routes from the satellite image, the candidate travel routes being used as the travel route to the destination.

13. The information processing method according to claim 4, further comprising:

acquiring multiple candidate travel routes from the satellite image, the candidate travel routes being used as the travel route to the destination.

* * * * *